US008691180B2

(12) United States Patent
Zettl et al.

(10) Patent No.: US 8,691,180 B2
(45) Date of Patent: Apr. 8, 2014

(54) CONTROLLED PLACEMENT AND ORIENTATION OF NANOSTRUCTURES

(75) Inventors: Alex K. Zettl, Kensington, CA (US); Thomas D. Yuzvinsky, Berkeley, CA (US); Adam M. Fennimore, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 1246 days.

(21) Appl. No.: 11/466,528

(22) Filed: Aug. 23, 2006

(65) Prior Publication Data

US 2010/0239488 A1    Sep. 23, 2010

Related U.S. Application Data

(60) Provisional application No. 60/711,481, filed on Aug. 25, 2005.

(51) Int. Cl.
*B32B 5/12* (2006.01)
*D01F 9/12* (2006.01)
*C01B 31/02* (2006.01)
*C01B 31/00* (2006.01)
*B05D 3/00* (2006.01)
*B05D 3/12* (2006.01)

(52) U.S. Cl.
USPC ........... 423/461; 427/532; 427/240; 977/700; 977/842; 977/844; 977/845; 977/746; 428/114

(58) Field of Classification Search
None
See application file for complete search history.

(56) References Cited

U.S. PATENT DOCUMENTS

| | | | |
|---|---|---|---|
| 4,156,745 A | | 5/1979 | Hatzakis et al. |
| 5,512,131 A | * | 4/1996 | Kumar et al. ................. 438/738 |
| 5,641,466 A | | 6/1997 | Ebbesen et al. |
| 5,910,392 A | | 6/1999 | Nozaki et al. |
| 6,274,289 B1 | * | 8/2001 | Subramanian et al. .... 430/273.1 |
| 6,628,053 B1 | | 9/2003 | Den et al. |
| 6,874,668 B2 | | 4/2005 | Cumings et al. |
| 6,965,823 B2 | * | 11/2005 | Wichner ......................... 701/59 |
| 7,053,520 B2 | | 5/2006 | Zetti et al. |
| 7,250,246 B2 | | 7/2007 | Mizutani |

(Continued)

FOREIGN PATENT DOCUMENTS

WO    WO 9629629 A2  *  9/1996

OTHER PUBLICATIONS

SPIE Handbook, vol. 1: Microlithography, Section 2.7.2; 2009.*

(Continued)

*Primary Examiner* — Guinever Gregorio
(74) *Attorney, Agent, or Firm* — Lawrence Berkeley; National Laboratory

(57) ABSTRACT

A method for controlled deposition and orientation of molecular sized nanoelectromechanical systems (NEMS) on substrates is disclosed. The method comprised: forming a thin layer of polymer coating on a substrate; exposing a selected portion of the thin layer of polymer to alter a selected portion of the thin layer of polymer; forming a suspension of nanostructures in a solvent, wherein the solvent suspends the nanostructures and activates the nanostructures in the solvent for deposition; and flowing a suspension of nanostructures across the layer of polymer in a flow direction; thereby: depositing a nanostructure in the suspension of nanostructures only to the selected portion of the thin layer of polymer coating on the substrate to form a deposited nanostructure oriented in the flow direction. By selectively employing portions of the method above, complex NEMS may be built of simpler NEMSs components.

14 Claims, 5 Drawing Sheets

350

(56) References Cited

U.S. PATENT DOCUMENTS

| | | | |
|---|---|---|---|
| 8,066,967 B2* | 11/2011 | Eberlein et al. | 423/461 |
| 2001/0023021 A1 | 9/2001 | Cohen et al. | |
| 2003/0190278 A1 | 10/2003 | Wang et al. | |
| 2004/0256358 A1 | 12/2004 | Shimizu et al. | |
| 2005/0052894 A1 | 3/2005 | Segal et al. | |
| 2005/0153236 A1 | 7/2005 | Lim et al. | |

OTHER PUBLICATIONS

Sagnes et al.; Alignment and Nano-Connections of Isolated Carbon Nanotubes; Microelectronic Engineering; 67-68, pp. 683-689; 2003.*

Scriven; Physics and Application of Dip Coating and Spin Coating; Material Research Society; vol. 121; 1988.*

Diehl et al., "Self-Assembled, Deterministic Carbon Nanotube Wiring Networks," Angewandte Chemie International Edition, vol. 41, No. 2, pp. 353-356, (2002).

Falvo et al., "Nanometre-scale rolling and sliding of carbon nanotubes," Nature, vol. 397, pp. 236-238, (Jan. 21, 1999).

Minett et al., "Nanotube actuators for nanomechanics," Current Applied Physics, vol. 2, No. 1, pp. 61-64, (2002).

Cumings et al., "Peeling and sharpening multiwall nanotubes," Nature, vol. 406, pp. 586, (Aug. 10, 2000).

Fraysse et al., "Carbon nanotubes acting like actuators," Carbon, vol. 40, No. 10, pp. 1735-1739, (2002).

Zhao et al., "Carbon Nanowire Made of a Long Linear Carbon Chain Inserted Inside a Multiwalled Carbon Nanotube," Physical Review Letters, vol. 90, No. 18, pp. 187401-1-187401-4, (May 6, 2003).

Rueckes et al., "Carbon Nanotube-Based Nonvolatile Random Access Memory for Molecular Computing," Science, vol. 289, pp. 94-97, (Jul. 7, 2000).

Collier et al., "Electronically Configurable Molecular-Based Logic Gates," Science, vol. 285, pp. 391-394, (Jul. 16, 1999).

Bachtold et al., "Logic Circuits with Carbon Nanotube Transistors," Science, vol. 294, pp. 1317-1320, (Nov. 9, 2001).

Tans et al, "Room-temperature transistor based on a single carbon nanotube," Nature, vol. 393, pp. 49-52, (May 7, 1998).

Huang et al., "Room-Temperature Ultraviolet Nanowire Nanolasers," Science, vol. 292, pp. 1897-1899, (Jun. 8, 2001).

Duan et al, "Indium phosphide nanowires as building blocks for nanoscale electronic and optoelectronic devices," Nature, vol. 409, pp. 66-69, (Jan. 4, 2001).

Misewich et al., "Electrically Induced Optical Emission from a Carbon Nanotube FET," Science, vol. 300, pp. 783-786, (May 2, 2003).

Wang et al., "Highly Polarized Photoluminescence and Photodetection from Single Indium Phosphide Nanowires," Science, vol. 293, pp. 1455-1457, (Aug. 24, 2001).

Bruchez et al., "Semiconductor Nanocrystals as Fluorescent Biological Labels," Science, vol. 281, pp. 2013-2016, (Sep. 25, 1998).

Sershen et al., "Temperature-sensitive polymer-nanoshell composites for photothermally modulated drug delivery," Journal of Biomedical Materials Research Part A, vol. 51, No. 3, pp. 293-298, (Sep. 5, 2000).

Modi et al., "Miniaturized gas ionization sensors using carbon nanotubes," Nature, vol. 424, pp. 171-174, (Jul. 10, 2003).

Kong et al., "Nanotube Molecular Wires as Chemical Sensors," Science, vol. 287, pp. 622-625, (Jan. 28, 2000).

Collins et al., "Extreme Oxygen Sensitivity of Electronic Properties of Carbon Nanotubes," Science, vol. 287, pp. 1801-1804, (Mar. 10, 2000).

Endo et al., "The Production and Structure of Pyrolytic Carbon Nanotubes (PCNTs)," Journal of Physics and Chemistry of Solids, vol. 54, No. 12, pp. 1841-1848, (1993).

Terrones et al., "Controlled production of aligned-nanotube bundles," Nature, vol. 388, pp. 52-55, (Jul. 3, 1997).

Kyotani et al., "Preparation of Ultrafine Carbon Tubes in Nanochannels of an Anodic Aluminum Oxide Film," Chemistry of Materials, vol. 8, No. 8, pp. 2109-2113, (1996).

Papadakis et al., "Resonant Oscillators with Carbon-Nanotube Torsion Springs," Physical Review Letters, vol. 93, No. 14, pp. 146101-1-146101-4, (Oct. 1, 2004).

Fennimore et al., "Rotational actuators based on carbon nanotubes," Nature, vol. 424, pp. 408-410, (Jul. 24, 2003).

Tseng et al., "Monolithic Integration of Carbon Nanotube Devices with Silicon MOS Technology," Nano Letters, vol. 4, No. 1, pp. 123-127, (2004).

Cumings et al., "Low-Friction Nanoscale Linear Bearing Realized from Multiwall Carbon Nanotubes," Science, vol. 289, pp. 602-604, (Jul. 28, 2000).

Huang et al., "Directed Assembly of One-Dimensional Nanostructures into Functional Networks," Science, vol. 291, pp. 630-633, (Jan. 26, 2001).

Xin et al., "Directional Orientation of Carbon Nanotubes on Surfaces Using a Gas Flow Cell," Nano Letters, vol. 4, No. 8, pp. 1481-1484, (2004).

Lay et al.,"Simple Route to Large-Scale Ordered Arrays of Liquid-Deposited Carbon Nanotubes," Nano Letters, vol. 4, No. 4, pp. 603-606, (2004).

Burghard et al., "Controlled Adsorption of Carbon Nanotubes on Chemically Modified Electrode Arrays," Advanced Materials, vol. 10, No. 8, pp. 584-588, (1998).

Liu et al., "Controlled deposition of individual single-walled carbon nanotubes on chemically functionalized templates," Chemical Physics Letters, vol. 303, pp. 125-129, (Apr. 2, 1999).

Rao et al., "Large-scale assembly of carbon nanotubes," Nature, vol. 425, pp. 36-37, (Sep. 4, 2003).

Williams et al., "Torsional Response and Stiffening of Individual Multiwalled Carbon Nanotubes," Physical Review Letters, vol. 89, No. 25, pp. 255502-1-255502-4, (Dec. 16, 2002).

Yamamoto et al., "Orientation and purification of carbon nanotubes using ac electrophoresis," Journal of Physics D: Applied Physics, vol. 31, No. 8, pp. L34-L36, (Apr. 21, 1998).

Valentin et al., "High-density selective placement methods for carbon nanotubes," Microelectronic Engineering, vols. 61-62, pp. 491-496, (2002).

Koval, "Mechanism of etching and surface relief development of PMMA under low-energy ion bombardment," Journal of Vacuum Science & Technology B, vol. 22, No. 2, pp. 843-851, (Mar./Apr. 2004).

See for example the NIST stopping power and range tables available at http://phyiscs.nist.gov/PhysRefData/Star/Text/contents.html and references contained therein.

Joy et al., "Experimental measurements of electron stopping power at low energies," Scanning Microscopy, vol. 10, No. 3, pp. 653-666, (1996).

Davenas et al., "Hydrogenated Carbon Layers Produced by Ion Beam Irradiation of PMMA and Polystyrene Films," Nuclear Instruments and Methods in Physics Research Section B: Beam Interactions with Materials and Atoms, vol. 46, pp. 317-323 (1990).

Niyogi et al., "Ultrasonic Dispersions of Single-Walled Carbon Nanotubes," Journal of Physical Chemistry B, vol. 107, pp. 8799-8804, (2003).

Yuzvinsky et al., "Controlled placement of highly aligned carbon nanotubes for the manufacture of arrays of nanoscale torsional actuators," Nanotechnology, vol. 17, pp. 434-438, (2006).

Xia et al., "A Facile Approach to Directed Assembly of Patterns of Nanoparticles Using Interference Lithography and Spin Coating," Nano Letters, vol. 4, No. 7, pp. 1295-1299, (2004).

Sagnes et al.; Alignment and Nano-Connections of Isolated Carbon Nanotubes; Microelectronic Engineering; 67-68, pp. 683-689, (2003).

* cited by examiner

FIG. 3A
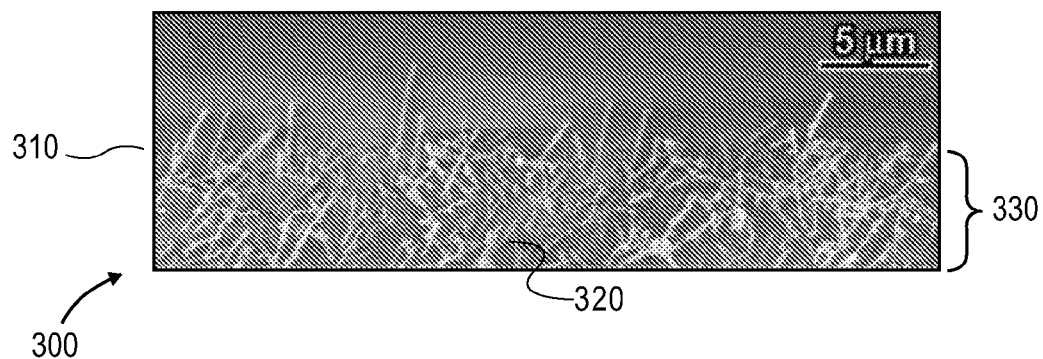
FIG. 3B
FIG. 3C
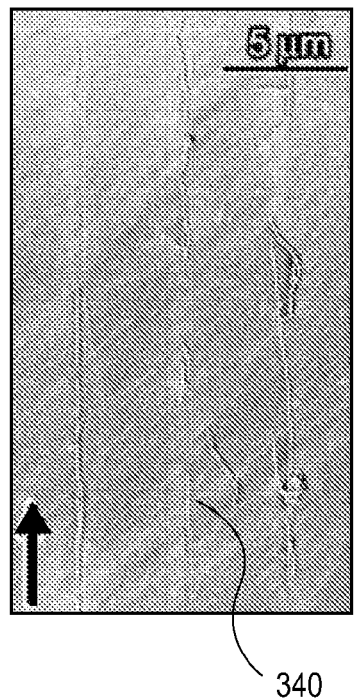
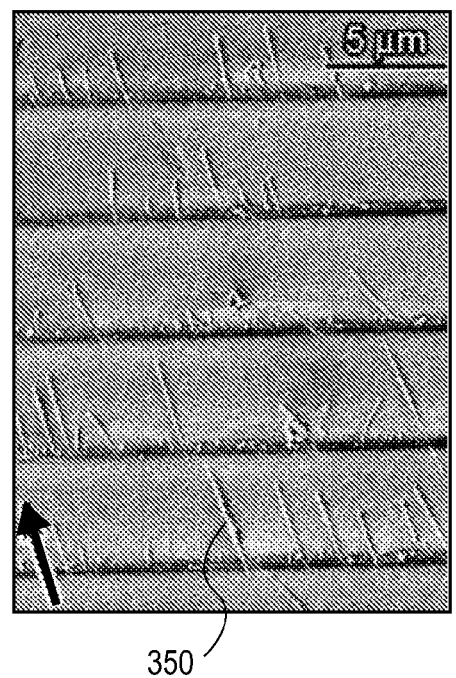

CONTROLLED PLACEMENT AND ORIENTATION OF NANOSTRUCTURES

CROSS-REFERENCE TO RELATED APPLICATIONS

This utility patent application claims benefit of priority to U.S. provisional patent application 60/711,481, filed Aug. 25, 2005, which is hereby incorporated by reference in its entirety.

STATEMENT OF GOVERNMENTAL SUPPORT

This invention was made during work supported by U.S. Department of Energy under Contract No. DE-AC02-05CH11231. The government has certain rights in this invention.

REFERENCE TO SEQUENCE LISTING OR COMPACT DISK

None

BACKGROUND OF THE INVENTION

1. Field of the Invention

The present invention generally relates to the field of nanostructure positioning and orientation on substrates, and more particularly to the field of molecular sized nanoelectromechanical systems (NEMS).

2. Related Art

US PG PUB 20030190278 "Controlled deposition of nanotubes" discloses methods for depositing nanotubes.

Diehl et al. "Self-assembled, deterministic carbon nanotube wiring networks," Angew. Chem. Int. Ed. 41:353 (2002) disclose a "minimal lithography" technique for chemically assembling small deterministic crossbars of SWNT ropes. Spatial positioning of the SWNTs is induced by an alternating current field.

Yamamoto et al. "Orientation and purification of carbon nanotubes using AC electrophoresis," J. Phys. D. Appl. Phys. 31: L34-L36 (1998) discloses orientation of nanotubes in isopropyl alcohol. The authors report that other methods for orienting nanotubes exist, such as slicing of a polymer resin matrix containing nanotubes and transferring nanotubes trapped in the pores of a ceramic filter onto a polymer surface.

Rao et al. "Larger-scale assembly of carbon nanotubes," Nature 425:36 (2003) discloses the assembly of single walled nanotubes (SWNTs) on organic molecular marks applied to a substrate by stamping or lithography. The authors created two distinct surface regions coated either with polar chemical groups or non-polar groups. The SWNTs adhered to the nonolar regions.

Lay et al. "Simple Route to Large-Scale Ordered Arrays of Liquid-Deposited Carbon Nanotubes" Nano Letters 4(4):603-606 (2004) discloses ordered arrays of carbon nanotubes deposited at room temperature from aqueous suspensions onto silanized $SiO_2$ surfaces.

Cumings et al. US 2002/0070426 A1 disclose a method for forming a telescoped multiwall carbon nanotube ("MWCNT"). Such a telescoped multiwall nanotube is shown in this publication to act as a linear bearing in an electromechanical system. That is, the walls of a multiwalled carbon nanotube are concentrically separated and are shown to telescope axially inwardly and outwardly. In Science 289: 602-604 (28 Jul. 2000), a scientific publication related to the 2002/0070426 A1 patent publication, Cumings and Zettl describe a low friction nanoscale linear bearing, which operates in a reciprocal (i.e. telescoping) manner.

Den et al. U.S. Pat. No. 6,628,053 discloses a carbon nanotube device comprising a support having a conductive surface and a carbon nanotube, wherein one terminus of the nanotube binds to the conductive surface so that conduction between the surface and the carbon nanotube is maintained. The device is used as an electron generator.

Falvo et al. Nature 397:236-238 (Jan. 21, 1997) disclose studies involving the rolling of carbon nanotubes using atomic force microscope (AFM) manipulation of multiwall carbon nanotubes (MWCNT, termed in the paper "CNT"). No bearing properties are disclosed.

Minett et al. Current Applied Physics 2:61-64 (2002) disclose the use of carbon nanotubes as actuators in which the driving force is obtained from a deformation of the nanotube when a charge is applied. The authors, in their review, also disclose the preparation of a suspended carbon nanotube across two metallic contacts growth of nanotubes across two metal contacts in a process that involved E-beam lithography and selective patterning.

Cumings et al. Nature 406:586 (Aug. 10, 2000) disclose techniques for peeling and sharpening multiwall nanotubes. These sharpened tubes are disclosed as having utility as biological electrodes, microscopic tips, etc.

Fraysse at al. Carbon 40:1735-1739 (2002) discloses carbon nanotubes that act like actuators. In concept, a SWNT may be disposed above a substrate and between a pair of metal-on-oxide layers. The nanotubes act as actuators though a cantilever effect achieved through longitudinal deformation of the nanotube.

Zhao et al. "Nanowire Made of a Long Linear Carbon Chain Inserted Inside a Multiwalled Carbon Nanotube," Rev. Lett. 90, 187401 (2003), discloses a one-dimensional (1D) carbon structure, carbon nanowires (CNWs), discovered in the cathode deposits prepared by hydrogen arc discharge evaporation of carbon rods.

Fennimore et al. "Rotational actuators based on carbon nanotubes," Nature 424, 408-410 (2003), discloses rotational actuators based on carbon nanotubes deposited on a substrate.

Recent advances in nanoscale synthesis and fabrication techniques have opened the door to the manufacture of true nanoelectromechanical systems (NEMS). For example, multiwall carbon nanotubes (MWCNTs) have been utilized as key enabling elements for nanoscale electrostatically-driven torsional[1] and rotational[2] actuators, orders of magnitude smaller than their microelectromechanical (MEMS) counterparts. Due to their small size, robust design and near-perfect atomic structure, such constructs hold great promise as building blocks for complex nanoelectromechanical systems. The utility of individual actuators can be significantly increased by their incorporation into arrays of devices. Such arrays could serve in a variety of applications, including adaptive optics, high frequency mechanical filters, mass sensors, and microfluidic gates and pumps.

A fundamental challenge in the development of NEMS arrays (and of nanotube- and nanowire-based devices in general) is the large-scale controlled placement of molecular sized building blocks on a substrate. Methods based on chemical vapor deposition (CVD) avoid this problem by, for example, growing nanotubes directly on the substrate where they ultimately will be located[3]. Unfortunately, such methods are unable to produce very high quality multi-walled carbon nanotubes as often required for NEMS applications[2,4]. Furthermore, CVD is commonly a high temperature process, which severely limits compatibility with substrate materials or other system components. Hence, there is much interest in low temperature techniques to aid in the selective placement and alignment of prefabricated nanostructures. There has been some progress in developing fluidic techniques for aligning nanowires[5] and nanotubes[6,7], and various functionalization schemes have been explored for placing nanotubes on particular areas of a substrate[8-10]. Unfortunately nearly all of these methods necessitate rather complex substrate topology or involved and limiting chemistry.

BRIEF SUMMARY OF THE INVENTION

The present invention comprises methods of placing one or more nanostructures in a predetermined position on a substrate, and the arrays thereby produced. The method of placing a nanostructure in a predetermined position on a substrate comprises: a) forming a thin layer of polymer coating on a substrate; b) exposing a selected portion of the thin layer of polymer to alter a selected portion of the thin layer of polymer; c) forming a suspension of nanostructures in a solvent, wherein the solvent suspends the nanostructures and activates the nanostructures in the solvent for deposition; and d) flowing a suspension of nanostructures across the layer of polymer in a flow direction; and thereby: e) depositing a nanostructure in the suspension of nanostructures only to the selected portion of the thin layer of polymer coating on the substrate to form a deposited nanostructure oriented in the flow direction.

The thin layer of polymer coating is preferably provided by a resist composition that can be chemically altered by incident radiation. This permits lithographic patterning of the layer, which can achieve a precise, yet complex positioning of nanostructures. Further, the orientation of deposited nanostructures may be controlled by controlling the flow of the solvent suspension. The substrate can be any material which can support nanostructures. Preferably the substrate is silicon which can be etched and processed with various layers according to known semiconductor manufacturing techniques.

A suspension of nanostructures can be achieved by preparation of nanostructures that are placed into a solvent and sonicated. The liquid "solvent" is preferably an aromatic solvent having good leaving groups that can bind with the nanostructures. The binding may include, but it not limited to: van der Waals, ionic, hydrogen, electrostatic, or covalent bonding. The solvent flow operates to cause individual nanostructures to adhere with a predefined orientation (aligned by the solvent flow) to selected portions of a substrate that has a polymer coating defined by radiation. This may be done by spin coating onto the substrate. In the case of roughly symmetric nanostructures, orientation may be unimportant, so flow may not be required for deposition.

Each nanostructure that is characterized by a high geometrical aspect ratio (including, but not limited to nanowires, nanorods, MWNTs, an others) or other asymmetry such as electric or magnetic dipole moment, is substantially oriented by flow of the nanostructure suspension relative to the coating. For some nanostructures, orientational order is unimportant, however the positional placement is still readily achieved by the methods described here.

By exposing a selected portion of the polymeric layer, predetermined regions which are adherent to nanostructures are defined. This patterning may be done by a variety of processes. In a preferred process, the polymeric layer is bombarded with an e-beam sufficient to break down the polymer in the selected areas to an elemental or roughened state, referred to as "carbonized." The layer is then removed with a solvent, leaving only a thin layer of roughened polymer.

One embodiment of the invention contemplates that the nanostructures are positioned in arrays to create higher order structures on a nanoscale. These higher order structures will involve further processing, while the nanostructures deposited by the present method have been found to remain in place. Further processing may include etching, metal deposition, or the addition of barrier or doping layers. Although not meant to be limiting, an array of nanorotors wired together is demonstrated here and included in the present invention. It is believed that the methods disclosed here may be used for other nanostructures to selectively position pluralities of nanostructures at controlled positions on a suitably coated substrate. For nanostructures having sufficiently high aspect ratios, the nanostructure suspension flow properties will align to the flow due to the shear properties. For low- to no-aspect nanostructures, a flow may not be required, as orientation may not be as important.

BRIEF DESCRIPTION OF THE DRAWINGS

FIG. 3A shows the controlled deposition of nanotubes, where the edge of an unaligned mat of MWCNTs deposited on an area activated by the electron beam. The edge of the beam-activated area runs horizontally through the center of the image.

FIG. 3B shows the controlled deposition of nanotubes, where SWCNTs are placed by fluidic alignment onto beam activated lines which were oriented parallel to the direction of fluid flow.

FIG. 3C shows the controlled deposition of nanotubes, where MWCNTs are placed by fluidic alignment perpendicular to beam-activated lines. The arrows indicate the direction of flow.

DETAILED DESCRIPTION OF THE PREFERRED EMBODIMENT

Definitions

Figure 1A:
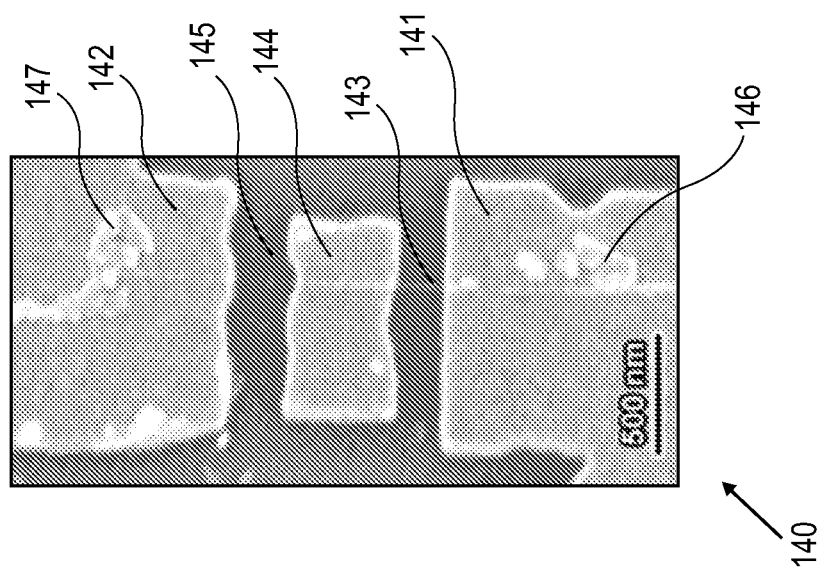
FIG. 1A is an array of MWCNTs placed by fluidic alignment and beam-activated adhesion.

Nanostructure means a nanoelectromechanical device that comprises one or more elements having at least one characteristic minimum dimension of less than or equal to 200 nm, and may be exemplified, without limitation, by components including one or more of: a nanotube; a nanowire; a nanorod; a noncrystalline or amorphous nanostructure; a nanocrystal; a supramolecular structure (i.e., a structure comprised of multiply-conjoined molecular and atomic units); a single walled carbon nanotube; a multiwalled carbon nanotube; a stripped (extendable) multiwalled carbon nanotube; a carbon nanowire; a carbon nanosheet; a carbon nanobelt; a carbon nanotube bundle; a boron-nitride nanotube; a silicon nanotube; a silicon nanobelt; a silicon nanowire; a compositionally modulated silicon nanowire; and a silicon nanosheets. Without limitation, some nanostructures act as nanomotors, nanomechanical resonators, nanobeam deflectors, sensors, actuators, device components, etc. Nanostructures have been proposed as the basic building blocks for a new generation of electronic and mechanical systems, including memory and logic components (e.g., see T. Rueckes, K. Kim, E. Joselevich, G. Y. Tseng, C. L. Cheung, and C. M. Lieber, *Science* 289, 94 (2000); C. P. Collier, E. W. Wong, M. Belohradsky, F. M. Raymo, J. F. Stoddart, P. J. Kuekes, R. S. Williams, and J. R. Heath, *Science* 285, 391 (1999); A. Bachtold, P. Hadley, T. Nakanishi, and C. Dekker, *Science* 294, 1317 (2001); S. J. Tans, A. R. M. Verschueren, and C. Dekker, *Nature* 393, 49 (1998)); light emitting devices and photodetectors (e.g., see M. H. Huang, S. Mao, H. Feick, H. Q. Yan, Y. Y. Wu, H. Kind, E. Weber, R. Russo, and P. D. Yang, *Science* 292, 1897 (2001); F. Duan, Y. Huang, Y. Cui, J. F. Wang, and C. M. Lieber, *Nature* 409, 66 (2001); J. A. Misewich, R. Martel, P. Avouris, J. C. Tsang, S. Heinze, and J. Tersoff, *Science* 300, 783 (2003); J. F. Wang, M. S. Gudiksen, X. F. Duan, Y. Cui, and C. M. Lieber, *Science* 293, 1455 (2001)); electromechanical actuators (e.g., see A. M. Fennimore, T. D. Yuzvinsky, W. Q. Han, M. S. Fuhrer, J. Cumings, and A. Zettl, *Nature* 424, 408 (2003)); biological imaging technologies (e.g., see M. Bruchez, M. Moronne, P. Gin, S. Weiss, and A. P. Alivisatos, *Science* 281, 2013 (1998)) and drug delivery systems (e.g., see S. R. Sershen, S. L. Westcott, N. J. Halas, and J. L. West, *Journal of Biomedical Materials Research* 51, 293 (2000)). With their small size and high surface-to-volume ratio, nanostructured devices can be faster, cheaper, more efficient, and more sensitive than their conventional analogues.

Dimension means the length, width, or height of a three dimensional object, such as a nanostructure. A minimum dimension means the smallest of length, width, or height for a particular nanostructure.

Solvent means a liquid comprising one or more constituents that is able to dissolve or suspend a nanostructure and allow the nanostructure to be deposited on an exposed polymer coating on a substrate.

Introduction

Although not meant to be limiting in any way, the controlled position and controlled orientation deposition of carbon nanotubes is described in great detail here below. These techniques have been successfully performed in the laboratory. It is believed that such techniques may be readily applied to other nanostructures for controlled deposition onto a suitably coated and prepared substrate. For nanostructures having sufficient aspect ratios, the orientation of the nanostructures may be controlled. By sequentially depositing and neutralizing the attachment sites on the substrates (whether by covering with a neutral layer, a metal layer, or other means), it is believed that further coating, sensitizing, and flowing may result in sequential sets of deposited nanostructures having controlled locations and orientations. It would appear that successive nanostructure depositions may be made with different nanostructures, allowing the building of large numbers of nanostructures having complex, potentially three-dimensional nature, with a variety of similar or different components.

Following is described the controlled orientation and controlled location deposition of carbon nanotubes that have mirrors mounted to them. Such devices may act as switches or controlled reflectors.

I. Experimental

Described below is the fabrication of ordered arrays of nanoscale torsional actuators consisting of metal mirrors bonded to precisely oriented multiwall carbon nanotubes. The fabrication is facilitated by a new nanotube alignment method that employs localized electron beam activation of a silicon-oxide surface. The processes involved a combination of novel room-temperature methods for both aligning and selectively depositing nanotubes onto a topologically benign surface. Using these methods, which can easily be integrated into traditional semiconductor manufacturing processes, arrays of aligned torsional NEMS devices based on MWCNTs have been fabricated.

FIG. 1A shows one section of a prototype array 100 of torsional actuators that has been produced. In the array 100 are rows of actuators 110, 120, and 130. An individual actuator 140, as described below in Section II, Generalized Apparatus, and shown in FIG. 1B, consists of five main elements: a bottom anchor 141, a top anchor 142, a suspended MWCNT 143 spanning between the bottom anchor 141 and the top anchor 142, a suspended rectangular metal mirror or paddle 144, and the conducting back gate 145 buried beneath the surface. The suspended MWCNT serves both as the torsional element and the electrical connection to the gold paddle mounted at its center. The two gold anchors 146 and 147 hold the ends of the MWCNT in place respectively on bottom anchor 146 and top anchor 147. Asymmetric electrostatic fields applied between the gold paddle and the back gate work to create an attractive force which causes the paddle to undergo an angular displacement and the MWCNT to twist. If the outer MWCNT shell is compromised, free rotational motion of the actuator becomes possible.

Figure 1B:
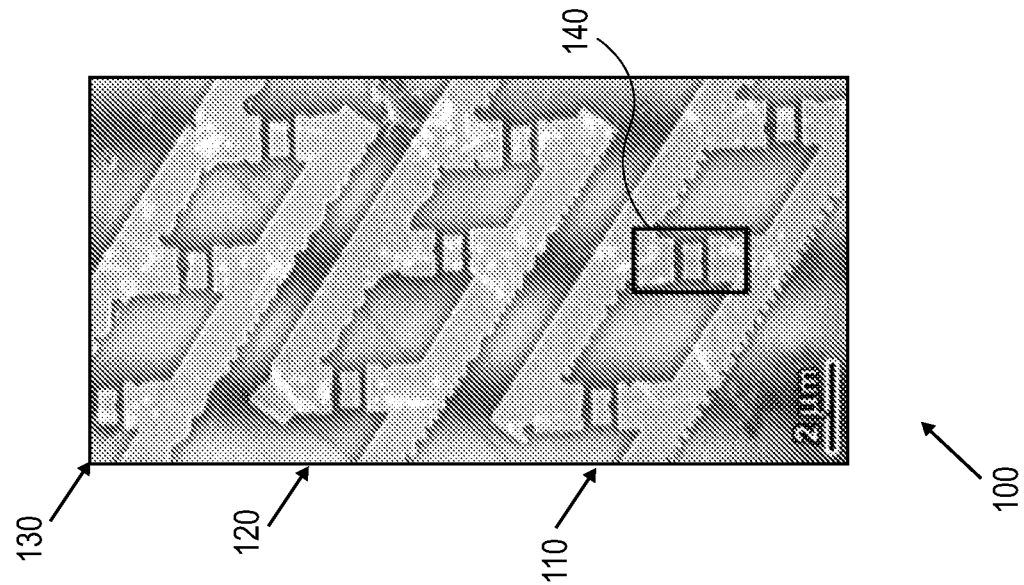
FIG. 1B shows an increased magnification image of the nanotube device marked with a black box in FIG. 1A, where the MWCNT support shaft can be just seen running vertically through the actuator paddle.

Actuators of the type shown in FIGS. 1A and 1B have been previously individually fabricated and characterized[1,2,11]. Effective torsional spring constants range from $10^{-15}$ to $10^{-12}$ N m, depending on the MWCNT geometry. Typical devices have moments of inertia ~10-30 kg m, yielding resonance frequencies in the tens of MHz range (with smaller paddle sizes and shorter exposed MWCNT lengths the resonance frequencies can be extended to above 1 GHz). A key advance of the present work is the ability to produce such devices, or any desired nanostructure, in an array configuration. The array of FIG. 1A was produced by first growing very high quality MWCNTs using an arc-plasma method, purifying the nanotubes, and then selectively depositing and aligning the nanotubes on an appropriate Si-based substrate for lithographic processing and creation of the NEMS device array.

One major enabling step in the array fabrication process is MWCNT targeted deposition and alignment. In this embodiment, the alignment method exploits the surface velocity obtained by a fluid as it flows off of a spinning substrate, and is distinct from previous alignment attempts involving either dielectrophoresis[12] or deposition from a solution driven across a surface by gas[6,7] or microfluidic flow[5]. Arc-grown MWCNTs were suspended in orthodichlorobenzene (ODCB) at a concentration of 100 mg/l by ultrasonication in a VWR Model 75D Aquasonic bath for 60 seconds at level 3. The suspension was then pipetted drop by drop onto the center of a silicon substrate mounted on a spin coater rotating at 3000 RPM. The suspension flowed radially across and off of the substrate. Once the surface is dry, the next drop is deposited. It has been found that if the next drop is deposited while the substrate is still wet, the deposition is less dense and contains a larger percentage of unaligned nanotubes.

The preferred nanotube concentration is between about 50 to 500 mg/l. Sonication is determined by the particular instrument or method used. The presently employed VWR Model 75D provides adequate dispersions/suspension at 30-120 seconds at level 3. The spin coater should generally be set to 3000 to 5000 RPM.

Figure 2:
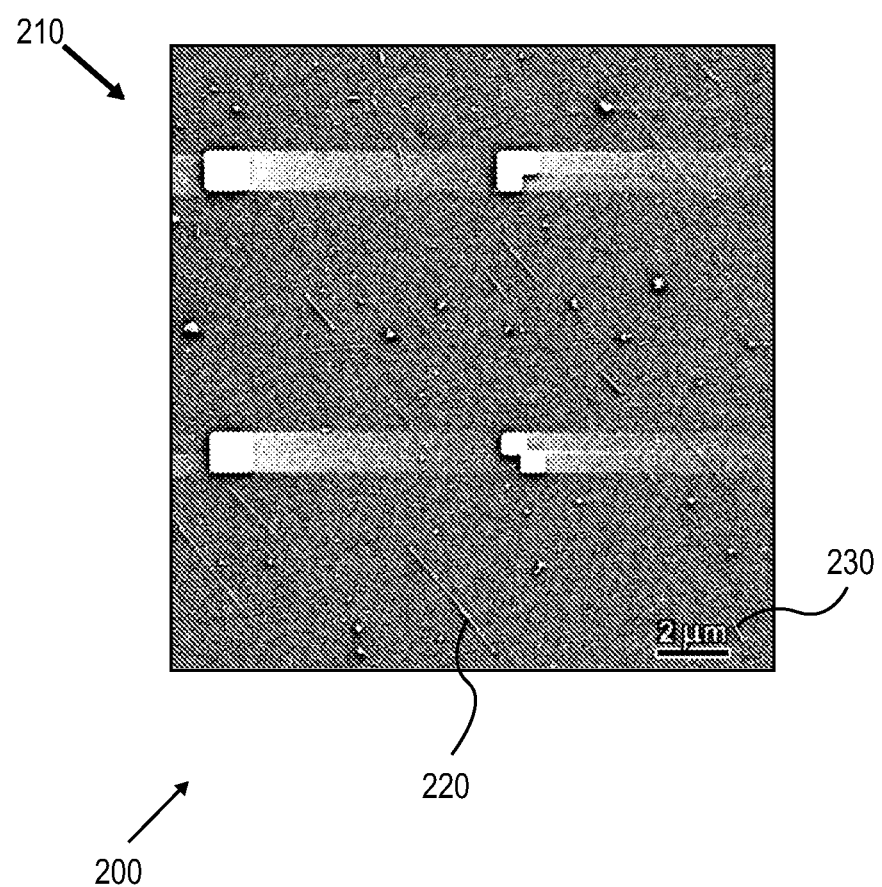
FIG. 2. Fluidic alignment of MWCNTs by spinning the substrate. A suspension of nanotubes was pipetted onto this sample while it was spinning at 5000 RPM, with the center of rotation ~6 mm below and to the right of the area shown. The substrate was in its pristine state before deposition; alignment marks were patterned and deposited afterwards.

FIG. 2 shows the results of a typical deposition/alignment run 200. MWCNTs are observed to align with the fluid flow direction 210 (from upper left to lower right in the figure), with longer MWCNTs (e.g. 220) generally more aligned than shorter segments (e.g. 230). Typically, 90% of MWCNTs over 1 μm in length lie within ±1° and 95% lie within ±5° of the direction of fluid flow, a significant improvement over previously reported results[6,7].

Although the MWCNTs of FIG. 2 are aligned, they are still randomly positioned. For many multi-component engineered NEMS structures, including arrays, pre-determined positional order is necessary. The deposition process can be further refined by locally activating the substrate to place MWCNTs in target locations. Previous targeting attempts via surface functionalization have been made using self-assembled monolayers (SAMs) with polar functional groups[8-10]. The success of these techniques is dependent upon the quality of the SAM, however, with degraded performance occurring when more (or less) than a monolayer is deposited[13]. Ideally, localized nanotube deposition should involve a surface layer which is simple to deposit and insensitive to variations in thickness.

One preferred location targeting method exploits a surface layer that is already present in standard lithographic work and does not require a single monolayer. The layer consists of the residual polymer left behind when resists used in electron beam lithography are removed by an acetone wash. In this method, poly[methylmethacrylate—methacrylic acid] (P[MMA-MAA]) in ethyl lactate (6%) was spun-coat at 3000 RPM for 30 seconds onto a silicon substrate with 1 μm of thermally grown oxide. It was then baked on a hot plate at 185° C. for 3 minutes and stripped in acetone for 5 minutes. When left untreated, the residual coating actually inhibits nanotube deposition out of ODCB, as evidenced by lower deposition rates than those seen on pristine silicon substrates.

Targeted adhesion of nanotubes by this layer is activated by exposure to the low energy electron beam of a scanning electron microscope (SEM). FIG. 3A shows 300 the edge 310 of a patterned area onto which nanotubes 320 have been randomly deposited with no alignment. The preferential deposition of nanotubes on the selected area (lower half of the FIG. 330) is easily apparent. By controlling the raster of the electron beam, it is possible to create any desired adhesion pattern on the substrate. By combining targeted adhesion and fluidic alignment, deposition of nanotubes in an ordered fashion becomes feasible. FIG. 3B shows single walled carbon nanotubes (SWCNTs) 340 that have been deposited from a solution flowing parallel to patterned lines of activated substrate, while FIG. 3C is an example of MWCNTs deposited from a solution flowing nearly perpendicular to patterned lines of activated substrate; here the trailing edge of the nanotubes adheres to the targeted region. MWCNT 350 is one example of a relatively longer MWCNT that is nearly perfectly aligned with the flow direction. If the activated regions are dots rather than lines, then a targeted array is possible, as is the case for the two-dimensional MWCNT array underlying the structures of FIG. 1A. If non-purified nanotubes are used in the alignment and targeted deposition process, carbon onions and other byproducts of the arc discharge process adhere to the beam activated areas as well.

To determine the source of selective deposition following electron beam activation, other surface coatings have been tested. Coatings of polymethylmethacrylate (PMMA) in anisole (2% PMMA) and in chlorobenzene (3.5% PMMA) produce similar results. Substrates with no polymer present (pristine wafers, or those which had been plasma cleaned or soaked for 12 hours in acetone) show no evidence of selective adhesion following beam exposure.

Polymer chains in PMMA experience several structural transitions when exposed to increasing doses of electron irradiation. At the low doses normally used in electron beam lithography, the polymer chains undergo scission, allowing for their selective removal by an appropriate developer. At higher doses, nearby chains become cross-linked. For an acceleration voltage of 15 keV, cross-linking prevails over scission at doses of ~1500 $\mu C/cm^2$. As the dosage is further increased, a highly cross-linked network is formed (~10000 $\mu C/cm^2$ at 15 keV)[14]. It has been found that the minimum dose for selective nanotube adhesion is 5000 $\mu C/cm^2$, with an optimal dose of ~50,000 $\mu C/cm^2$.

These doses, however, are only effective at low acceleration voltages (~1 keV), and correspond to much higher doses at 15 kV. Due to their higher interaction cross-section, low energy electrons have a higher stopping power than high energy electrons (stopping power is the rate at which electrons transfer energy to the material they are traveling through and has been studied extensively for many materials[15]). For carbon, the stopping power of 1 keV electrons is roughly seven times greater than that of 15 keV electrons[16]. A minimum dose of 5000 $\mu C/cm^2$ at 1 keV is therefore far in excess of the equivalent cross-linking threshold dose discussed above, which suggests modification of the PMMA beyond simple cross-linking PMMA has also been shown to graphitize when subjected to large doses of ion beam irradiation[17]. The lack of adhesion to cross-linked networks and the large effective doses being delivered are highly suggestive that the graphitization threshold has been reached. It is believed that knowledge this is the first time this effect has been demonstrated with electron beam irradiation.

Targeted deposition is selective to the solvent used in the nanotube suspension. The effect is not observed for a majority of common solvents and solutions (dichloroethane, isopropanol, acetone, ethyl lactate, and 1% sodium dodecyl sulfate in water). Of the solvents tested to date, only ODCB (and to a lesser extent, methoxybenzene) resulted in effective targeted deposition. Ultrasonication of SWCNT in ODCB has been shown to create a sonopolymer which coats the surface of the nanotubes.[18] Although this method requires less ultrasonication than was reported to cause significant coating by the sonopolymer, inspection of similarly dispersed MWCNTs by TEM has shown that while the nanotubes are still mostly pristine, there are isolated sections covered with a thin amorphous coating. It is suggested that polymerized solvent adhering to the nanotubes increases their interaction with the beam activated substrate—in effect, the nanotubes must be activated along with the substrate.

Once arrays of MWCNTs or similar structures have been deposited, further processing and device fabrication can be relatively straightforward. In the torsional actuator demonstration array, the nanotubes are first placed in an array configuration on a degenerately doped silicon wafer with 1 micron of thermally grown oxide on its top surface. The paddle and anchors are then patterned by electron beam lithography and deposited by electron beam evaporation of gold. To suspend the structures, approximately 500 nm of the silicon oxide is selectively removed with a buffered hydrofluoric acid etch. In the prototype array shown in FIG. 1A, each row of actuators is connected together to simplify the wiring arrangement and still allow for semi-independent actuation. The actuators could be made completely independent through the use of vias or a segmented back gate. Multilayer processing would also allow for higher density packing of devices.

Torsional actuator arrays operating at radio frequencies might find use in optical switching or in adaptive optics applications. With each actuator serving as a high frequency mechanical filter, such an array could also be used for parallel signal processing in telecommunications. Furthermore, by tracking the frequency shift of each actuator, an array of individually functionalized actuators could be used as mass sensors for simultaneous environmental monitoring of a variety of substances.

The ability of the invention described here to orient and preferentially place molecular structures paves the way for their integration into mass produced devices. Aside from the torsional actuator array already described, an immediate, simple application is the use of nanotubes as electrical interconnects between units of an integrated circuit (especially desirable due to their ability to carry extremely high electrical and thermal current densities). The unique physical properties of carbon nanotubes could be harnessed in other applications as well, such as high density arrays of field effect transistors, gas sensors or biosensors. Alternate geometrical configurations, including radially aligned nanotubes, crossed nanotubes, etc. could be easily fabricated using the techniques described here.

II. Generalized Method and Apparatus
A. Higher Order Structures

The present method and structure utilizes a nanotube to which has been affixed a rotor plate that can be rotatably moved about the nanotube axis in a torsional, reciprocating manner (actuator) or, alternatively, can be rotated in a 360° spinning mode (motor). The axial movement is imparted by electrostatic forces between the rotor and at least one stator. These elements are electrically conductive and therefore generate electrical forces and fields that will cause movement of the rotor through attractive or repulsive forces, either electrostatically or magnetically. Alternatively, if the rotor is made magnetic (e.g. if the rotor is made of a ferromagnetic material such as iron), it can be moved by magnetic field-generated forces. A spinning ferromagnetic material throws off a magnetic current and may be used as a generator.

The actuator/motor is essentially designed like an electric motor which has a plurality of electrically chargeable components in fixed relation to a rotating member on a nanotube axle. The overall size scale of the present actuator/motor is of the order of 300 nm. This will convey a sense of the size of the present device, wherein the diameter of the MWNT is approximately 5 to 100 nanometers and the gap between the anchor pads can be as small as 200 nm.

Figure 4B:
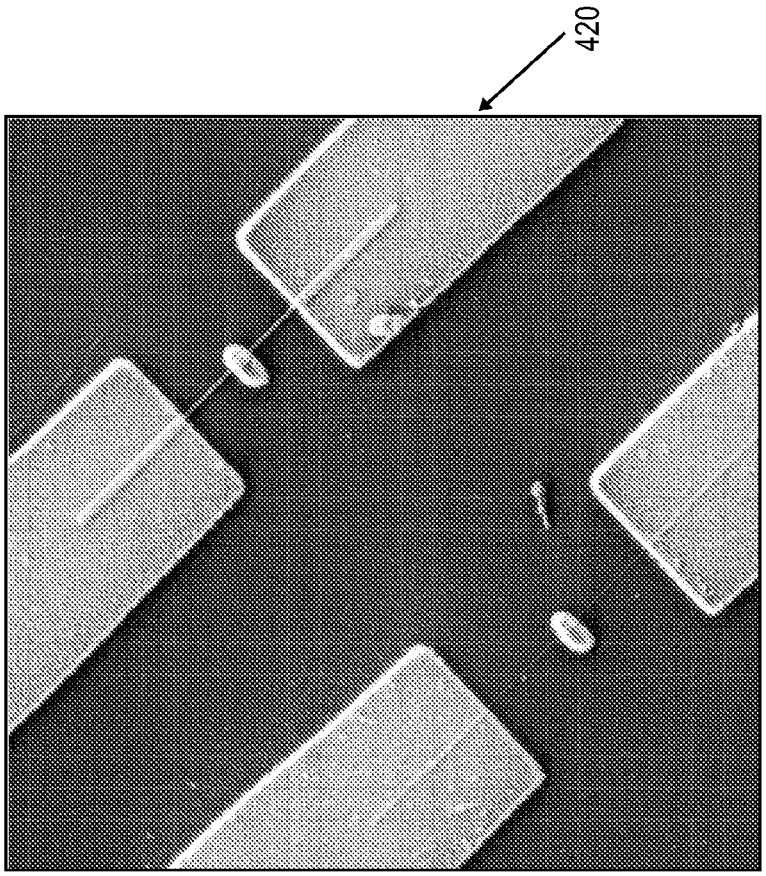
FIG. 4B is an electron microscopic view of two pixels of a proposed implementation of the array of FIG. 4A.
Figure 4A:
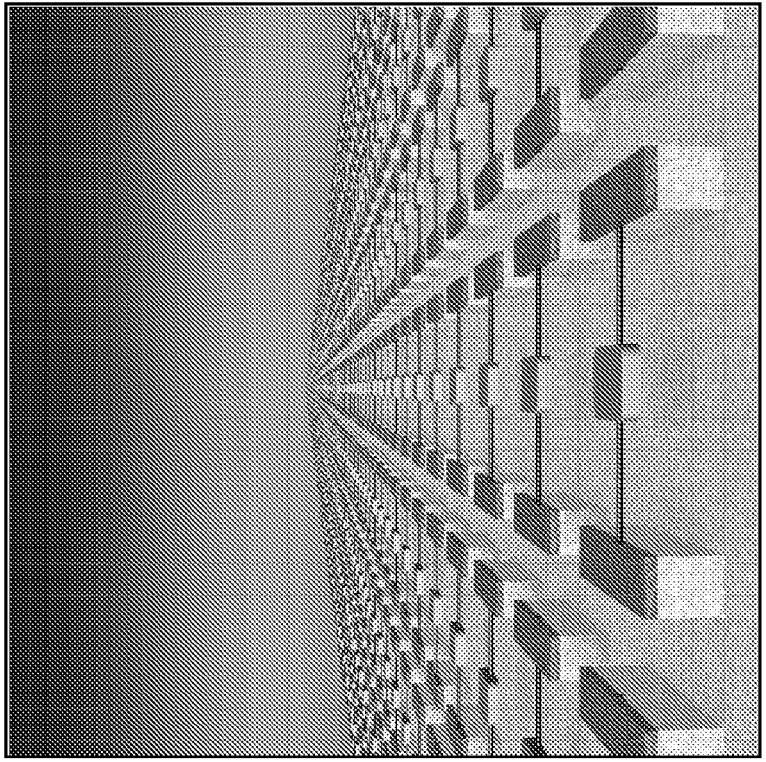
FIG. 4A is a graphic representation of arrays of the nanotubes according to the present method.

FIG. 4A shows that the rotor plate, when covered with metal, could serve as a mirror, with obvious relevance to ultra-high-density optical sweeping and switching devices 400 (the total actuator/motor size is just at the limit of visible light focusing). The light source could be any type of optical signal. A detailed view of two pixels 410, 420 in such an implementation is shown in FIG. 4B.

The light source could be above the substrate or in plane. It could be used for on-chip fabrication. In this case, the light/laser beam would come in horizontally, perpendicular to the nanotube, perhaps passing just above the rotor in its relaxed, horizontal state. When the rotor is flat the beam would not be deflected, but upon application of a voltage and rotation of the rotor, the beam would be reflected up above the plane to another device or channel.

The rotor plate could also serve as a paddle for inducing and/or detecting fluid motion in microfluidics systems, as a gated catalyst in wet chemistry reactions, as a bio-mechanical element in biological systems, or as a general (potentially chemically functionalized) sensor element. In a microfluidics application, the fluid would be channeled between an actuator and an anchor, and such projections would be etched in a way so as to define fluid impermeable channels. It is also possible that the charged oscillating metallic plate could be used as a transmitter of electromagnetic radiation.

Construction of a nanorotor device is further described in US PG PUB 20050017598 "Rotational actuator or motor based on carbon nanotubes," and Modi, A., N. Koratkar, et al. 2003, "Miniaturized gas ionization sensors using carbon nanotubes," Nature 424 (July 10):171-174, Kong et al. "Nanotube molecular wires as chemical sensors," Science. 2000 Jan. 28; 287(5453):622-5, hereby incorporated by reference.

As shown in FIG. 3B of the '598 PGPUB, the resist was patterned using commercially available electron beam writing software, namely NPGS software (Nanometer Pattern Generating System, which may be obtained from available from Joe Nabity, Ph.D. J C Nabity Lithography Systems P.O. Box 5354 Bozeman, Mont. 59717 USA), loaded on a JEOL 6400 SEM (JEOL USA, Inc.). The JEOL-6400 with NPGS is a high-resolution, electron beam lithography system used for writing complex patterns in resists from the nanometer scale up to 5 mm. The striped regions in FIG. 3B of the PG PUB represent areas of resist where the e beam struck and disrupted the resist so that it could be removed in subsequent steps. The electron beam resist was developed in methyl isobutyl ketone:isopropyl alcohol 1:3 for one minute, causing removal of the resist. Next, chromium (10 nm), then gold (90 nm) was evaporated onto the nanotube and (incidentally) the surrounding area. The Cr layer improves adhesion of the gold that is used for electrodes and stators. Next, the resist that remained after the MIBK step (FIG. 3C of the PG PUB), and the Au/Cr on top of it, were lifted off in acetone. The Cr/Au was subsequently annealed at 400° C. to ensure better electrical and mechanical contact between the Cr and the MWNT.

Then, as shown in FIG. 3F of the PG PUB, an HF etch was used to remove roughly 500 nm of the $SiO_2$ surface to provide clearance sufficient to permit the rotor plate to be rotated by 90° C. (and more). Note that the area under the rotor R is exposed to the HF from the sides through an undercutting process so that the Au/CR attached to the nanotube is free of underlying $SiO_2$. That is, the tube and metal are resting on the anchors that are into and above the plane of the drawing, along the axis of the nanotube. The conducting Si substrate (typically used as the "back gate" electrode in three-terminal nanotube field-effect devices) here serves as the gate stator, i.e. below the rotor plate.

In addition to arrays of rotators, arrays of sensors can be fabricated. SWNT chemical gas sensors are described in Collins et al. "Extreme oxygen sensitivity of electronic properties of carbon nanotubes," Science 287:1801-1804 (2000), hereby incorporated by reference for purposes of describing nanotubes configurable as gas sensors.

B. Nanotubes

The preferred nanotube, particularly in connection with the higher order configuration including a rotatable element is a multiwalled carbon nanotube (MWNT). MWNTs were synthesized by the standard arc technique as described in Ebbesen et al. U.S. Pat. No. 5,641,466 issued Jun. 24, 1997, hereby incorporated by reference to describe a method for large-scale synthesis of carbon nanotube. These nanotubes have a near perfect carbon tubule structure that resembles a sheet of sp2 bonded carbon atoms rolled into a seamless tube. They are generally produced by one of three techniques, namely electric arc discharge, laser ablation and chemical vapor deposition. The arc discharge technique involves the generation of an electric arc between two graphite electrodes, one of which is usually filled with a catalyst metal powder (e.g. iron, nickel, cobalt), in a Helium atmosphere. The laser ablation method uses a laser to evaporate a graphite target which is usually filled with a catalyst metal powder too. The arc discharge and laser ablation techniques tend to produce an ensemble of carbonaceous material which contain nanotubes (30-70%), amorphous carbon and carbon particles (usually closed-caged ones). The nanotubes must then be extracted by some form of purification process before being manipulated into place for specific applications. The chemical vapor deposition process utilizes nanoparticles of metal catalyst to react with a hydrocarbon gas at temperatures of 500-900° C. A variant of this is plasma enhanced chemical vapor deposition in which vertically aligned carbon nanotubes can easily be grown. In these chemical vapor deposition processes, the catalyst decomposes the hydrocarbon gas to produce carbon and hydrogen. The carbon dissolves into the particle and precipitates out from its circumference as the carbon nanotube. Thus, the catalyst acts as a 'template' from which the carbon nanotube is formed, and by controlling the catalyst size and reaction time, one can easily tailor the nanotube diameter and length respectively to suit. Carbon tubes, in contrast to a solid carbon filament, will tend to form when the catalyst particle is ~50 nm or less because if a filament of graphitic sheets were to form, it would contain an enormous percentage of 'edge' atoms in the structure. Alternatively, nanotubes may be prepared by catalytic pyrolysis of hydrocarbons as described by Endo, et al., in J. Phys. Chem. Solids, 54, 1841 (1993), or as described by Terrones, et al., in Nature, 388, 52 (1997) or by Kyotani, et al., in Chem. Mater., 8, 2190 (1996), the contents of all of which are incorporated by reference for describing nanotube preparation.

Alternative forms of nanotubes (e.g. boron nitride) can be formulated with boron, nitrogen, or other elements. Suitable materials are described in US PGPUB 20010023021 "BxCyNz nanotubes and nanoparticles," hereby incorporated by reference as describing the making of suitable boron nitride nanotubes. Single walled nanotubes can also be used to provide a rotor support component for embodiments not involving free rotation, i.e. actuators, which have reciprocating radial movement.

C. Substrate

The present structure was formed by the deposition of various layers and components onto a crystalline silicon chip. Degenerately doped silicon substrates were covered with $SiO_2$. Silicon was chosen because photolithographic, etching, and other techniques for its manipulation are readily available. Other inert materials that can be physically shaped could also be used for the present actuator/motor, such as plastic polymer or glass. Flexible polymer films may also be employed as substrates. Polymreic material such as used in the resist could also be used.

D. Deposition of Nanotubes in Preselected Areas

As described above, the present method for selective deposition of nanotubes involves the use of standard semiconductor processing technology, for ease of scale up. However, variations on the described are possible. The steps in placing one or more nanotubes in a preselected location include: coating the substrate with a resist; patterning the resist to provide nanotube-adherent regions; and flowing an appropriate nanotube suspension across the patterned substrate so that the nanotubes are aligned in a direction of flow and "stick" at the defined adherent regions. Essentially, a positive resist is used whereby, when the resist is exposed to radiation, the radiation breaks down the resist and allows it to be removed by an appropriate solvent. The resist is not entirely removed, leaving a thin layer behind which "snags" or adheres to carbon-containing nanotubes. The preferred interaction is carbon-carbon (i.e. hydrophobic), but other interactions may be designed. Without being bound to any one theory, it is thought that the high exposure to electron beam radiation breaks down the resist to an amorphous layer containing at least a portion of elemental or graphitic carbon, which adheres to the nanotubes, while the unexposed resist retains its ordered, crystalline, and/or polymeric form, presenting little surface attraction for nanotubes moving across the surface.

Resist

The term "resist" is used in a general sense as used in microcircuit fabrication. It need only be resistant to nanotube adhesion in one state (i.e. in the unexposed state in the case of a positive resist) and adhesive to nanotubes in the other state (i.e. exposed state in the case of a positive resist). Positive resists are preferred, in that the radiation exposure used is much higher than ordinarily employed, in order to chemically break down the resist. For e-beam resists, it is preferred to use low acceleration voltage (0.1-2, preferably about 1.0 keV). The exposure time is adjusted to provide at least about 5,000 $\mu C/cm^2$, preferably about 50,000 $\mu C/cm^2$. Other forms of radiation may be used, e.g. x-rays or intense light (e.g. extreme ultraviolet).

Some of the positive e-beam resists are: PMMA (Poly methyl methacrylate), EBR-9 (another acrylate based resist), PBS (Poly butene-1-sulphone), ZEP (a copolymer of a-chloromethacrylate and a-methylstyrene).

Polymethyl methacrylate (PMMA) was one of the first materials developed for e-beam lithography. It is the standard positive e-beam resist and remains one of the highest resolution resists available. PMMA is usually purchased in two high molecular weight forms (496 K or 950 K) in a casting solvent such as chlorobenzene or anisole. PMMA is spun onto the substrate and baked at 170 C to 200 C for 1 to 2 hours. Electron beam exposure breaks the polymer into fragments that are typically dissolved by a developer such as MIBK. MIBK is usually diluted by mixing in a weaker developer such as IPA. A mixture of 1 part MIBK to 3 parts IPA produces very high contrast but low sensitivity. By making the developer stronger, say, 1:1 MIBK:IPA, the sensitivity is improved significantly with only a small loss of contrast. EBR-9 is an acrylate-based resist, poly(2,2,2-trifluoroethyl-chloroacrylate), sold by Toray Inc. This resist is 10 times faster than PMMA, ~10 $C/cm^2$ at 20 kV. Its resolution is, however, more than 10 times worse than that of PMMA, ~0.2 m. Poly(butene-1-sulfone) is a common high-speed positive resist used widely for mask plate patterning. For high-volume mask plate production, the sensitivity of 1 to 2 $C/cm^2$ is a significant advantage over other positive resists. However, the processing of PBS is difficult and the only advantage is the speed of exposure. Another possible resist is ZEP-520 from Nippon Zeon Co. ZEP consists of a copolymer of -chloromethacrylate and -methylstyrene. Sensitivity at 25 kV is between 15 and 30 $C/cm^2$, an order of magnitude faster than PMMA and comparable to the speed of EBR-9. Unlike EBR-9, the resolution of ZEP is close to that of PMMA. Other UV sensitive resists used for e-beam include EBR900 from Toray, the chemically amplified resist ARCH from OCG, and the deep-UV resists UVIII and UVN from Shipley. The products from Shipley have been optimized for DUV (248 nm) exposure, and have higher resolution than that of AZ5206. The use of DUV resists allows exposure by both photons and electrons in the same film, thereby reducing e-beam exposure time.

A negative resist could be used, for example, by sputtering it with carbon atoms. The top surface is made rough or chemically active enough to snag nanotubes. One then patterns the resist in the usual way and get snagging areas left in the locations that have been patterned. The developed areas everywhere else would not have the carbon coating and would not snag. PMMA itself can be a negative resist, with high radiation doses as done in the examples (see http://www.jc-nabity.com/negwheel.htm). If these samples were to be developed (put in acetone) after the high dosage treatment, the polymer everywhere else would be removed but the burnt-in sections would remain, so, in a sense this is a negative resist.

Some of the negative tone e-beam resists are: COP (an epoxy copolymer of glycidyl methacrylate and ethyl acrylate) and Shipley SAL (has 3 components, a base polymer, an acid generator, and a crosslinking agent).

Another suitable resist is disclosed in US PGPUB 20050164123 to Mizutani, published Jul. 28, 2005, entitled "Positive resist composition and pattern formation method using the same." A suitable acrylate olefin copolymer resist is disclosed in US PGPUB 20050153236 to Lim, et al. published Jul. 14, 2005, entitled "Novel polymer and chemically amplified resist composition containing the same." US PGPUB 20040256358 to Shimizu, et al., Dec. 23, 2004, also discloses suitable resists and removal solvent. U.S. Pat. No. 5,910,392 to Nozaki, et al., issued Jun. 8, 1999, entitled "Resist composition, a process for forming a resist pattern and a process for manufacturing a semiconductor device" discloses another suitable type of resists for use with an eximer laser. A wide variety of acrylate-based resists are known in the art, which would be adaptable to the present process. A number of suitable acrylate resists are disclosed in U.S. Pat. No. 4,156,745 to Hatzakis, et al. issued May 29, 1979, entitled "Electron sensitive resist and a method preparing the same." All these published applications and patents are incorporated by reference for purposes of describing the manufacture, application, radiation and removal of suitable resists.

Removing Resist

In general, any solvent may be used to remove the resist; it is important to match the solvent to the resist and to adjust the solvent exposure to leave a thin layer of resist, rather than just underlying substrate. Various types of organic remover solutions have been proposed including mixtures of organic solvents such as phenol, halogenated hydrocarbon solvents and the like and a surface active agent such as alkylbenzene sulfonic acid and the like, mixtures of an alkylbenzene sulfonic acid, etc. A thin layer is considered to be preferably 1-4 nm, but may be more, depending on the topology desired in the final product. For example, when using PMMA, one may use methylene chloride and acetone, which will strip PMMA, as will NMP (Remover 1165). PMMA is also is removed very well by strong bases (KOH), and by acid normally hostile to organics, such as NanoStrip. Oxygen plasmas also etch PMMA very well.

The presently preferred process uses pure acetone for 3-10 minutes, most preferably about 5 min.

Nanotube Suspensions

As described, nanotubes may be suspended in a solvent in a soluble or insoluble form and spin-coated over a surface to generate a composite nanotube/nanowire film. In such an arrangement the film created may be one or more nanotubes, depending on the spin profile and other process parameters. With regard to the solution for suspending the nanotubes, ODCB and methoxybenzene have been exemplified. Other solvents that form a coating on nanotubes which promote adhesion to a carbonized surface may be employed. The term "carbonized" is used in a general sense to refer to layers which are not polymeric chains, but rather forms of elemental carbon, including graphite, etc. These include other halogenated benzene compounds.

Appropriate solvents include and are not limited to: dimethylformamide, n-methyl pyrollidinone, n-methyl formamide, orthodichlorobenzene, and paradichlorobenzene. Other materials such as 1,2, dichloroethane, alcohols, water with appropriate surfactants such as sodium dodecylsulfate or TRITON X-100 may be used in combination with these solvents. For a discussion of possible solvents, see US PGPUB 20050052894 to Segal et al. published Mar. 10, 2005, "Uses of nanofabric-based electro-mechanical switches," hereby incorporated by reference relative to coating and depositing nanotubes and nanowires.

In one aspect of the invention may comprise a sonicated suspension of nanotubes in an organic solvent, comprising an aromatic compound bound to a good leaving group (i.e. that is replaced in a nucleophilic substitution reaction). Anything with a pKa of less than about 25 is a good leaving group if the molecule bears a negative charge and can form a carbonyl group when the leaving group leaves. As is known, "good leaving groups" include halides, tosyl groups, NH3, etc.

Application of Nanotubes to Substrate

The nanotube suspension, in appropriate solvent, is spin coated onto the substrate having a treated resist layer defining sticking points for the nanotubes. The orientation of the nanotubes is determined by the direction of flow. The nanotubes align longitudinally along the direction of flow. The flow will be radial across the center of rotation in a spin coating step. The center of rotation may be changed to achieve different nanotube orientations, as described below in connection with FIG. 5. Alternatively, a gas flow cell may be used to slow the nanotube suspension across the substrate, which then may remain stationary. Suitable liquid or gas flow cells are commercially available, e.g. for use with spectrophotometers (e.g. Axsun NIR analyzers). Further description of a gas flow cell implementation is found in Xin et al. "Directional Orientation of carbon nanotubes on surfaces using a gas flow cell," Nano Letters 4:1481-1484 (2004), hereby incorporated by reference as guidance for implementation of a flow cell device for delivering a nanotube suspension to a substrate.

Figure 5:
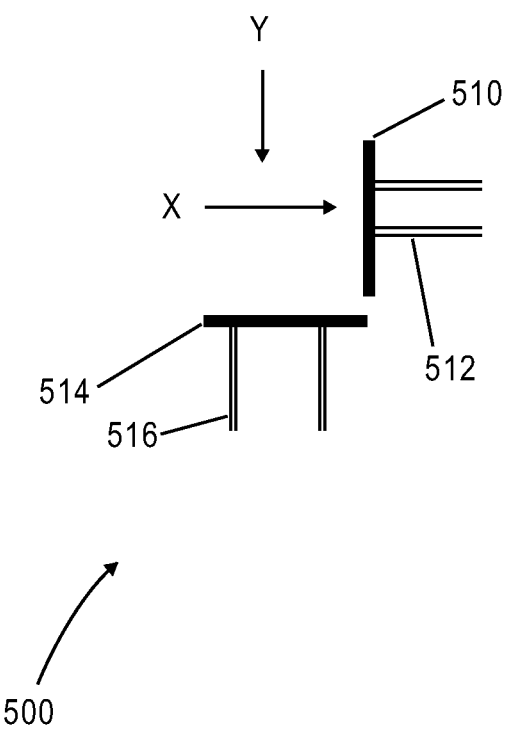
FIG. 5 is a schematic illustration of adhesion of tubes to different polymer lines.

As shown in FIG. 5, it is thought that tubes may be arrayed orthogonally, or at any desired angle, or in contact with each other 500. When the substrate is rotated so that radial flow follows the $\vec{X}$ direction in the plane of the paper, tubes 512 will adhere to line 510 at their trailing edge. The substrate (or alternatively the flow chamber) may then be rotated so that radial flow follows the $\vec{Y}$ direction (also in the plane of the paper), and tubes 516 will adhere to line 514, oriented in the direction of outward flow from rotational center Y.

CONCLUSION

While the foregoing structures and their methods of construction and operation has been described in reference to particular embodiments, many variations and embellishments are possible in view of the above teachings. Therefore, it is intended that the present invention not be limited to the specific embodiments described above, but rather to the scope of the appended claims.

REFERENCES (1) Papadakis, S. J.; Hall, A. R.; Williams, P. A.; Vicci, L.; Falvo, M. R.; Superfine, R.; Washburn, S. Resonant Oscillators with Carbon-Nanotube Torsion Springs. Physical Review Letters 2004, 93, 146101.
(2) Fennimore, A. M.; Yuzvinsky, T. D.; Han, W. Q.; Fuhrer, M. S.; Cumings, J.; Zettl, A. Rotational actuators based on carbon nanotubes. Nature 2003, 424, 408.
(3) Tseng, Y. C.; Xuan, P. Q.; Javey, A.; Malloy, R.; Wang, Q.; Bokor, J.; Dai, H. J. Monolithic integration of carbon nanotube devices with silicon MOS technology. Nano Letters 2004, 4, 123.
(4) Cumings, J.; Zettl, A. Low-friction nanoscale linear bearing realized from multiwall carbon nanotubes. Science 2000, 289, 602.
(5) Huang, Y.; Duan, X. F.; Wei, Q. Q.; Lieber, C. M. Directed assembly of one-dimensional nanostructures into functional networks. Science 2001, 291, 630.
(6) Xin, H. J.; Woolley, A. T. Directional orientation of carbon nanotubes on surfaces using a gas flow cell. Nano Letters 2004, 4, 1481.
(7) Lay, M. D.; Novak, J. P.; Snow, E. S. Simple route to large-scale ordered arrays of liquid-deposited carbon nanotubes. Nano Letters 2004, 4, 603.
(8) Burghard, M.; Duesberg, G.; Philipp, G.; Muster, J.; Roth, S. Controlled adsorption of carbon nanotubes on chemically modified electrode arrays. Advanced Materials 1998, 10, 584.
(9) Liu, J.; Casavant, M. J.; Cox, M.; Walters, D. A.; Boul, P.; Lu, W.; Rimberg, A. J.; Smith, K. A.; Colbert, D. T.; Smalley, R. E. Controlled deposition of individual single-walled carbon nanotubes on chemically functionalized templates. Chemical Physics Letters 1999, 303, 125.
(10) Rao, S. G.; Huang, L.; Setyawan, W.; Hong, S. H. Large-scale assembly of carbon nanotubes. Nature 2003, 425, 36.
(11) Williams, P. A.; Papadakis, S. J.; Patel, A. M.; Falvo, M. R.; Washburn, S.; Superfine, R. Torsional Response and Stiffening of Individual Multiwalled Carbon Nanotubes. Physical Review Letters 2002, 89, 255502.
(12) Yamamoto, K.; Akita, S.; Nakayama, Y. Orientation and purification of carbon nanotubes using ac electrophoresis. Journal of Physics D-Applied Physics 1998, 31, L34.
(13) Valentin, E.; Auvray, S.; Goethals, J.; Lewenstein, J.; Capes, L.; Filoramo, A.; Ribayrol, A.; Tsui, R.; Bourgoin, J. P.; Patillon, J. N. High-density selective placement methods for carbon nanotubes. Microelectronic Engineering 2002, 61-2, 491.
(14) Koval, Y. Mechanism of etching and surface relief development of PMMA under low-energy ion bombardment. Journal of Vacuum Science \& Technology B 2004, 22, 843.
(15) See for example the NIST stopping power and range tables available at http://phyiscs.nist.gov/PhysRefData/Star/Text/contents.html and references contained therein.
(16) Joy, D. C.; Suichu, L.; Gauvin, R.; Hovington, P.; Evans, N. Experimental measurements of electron stopping power at low energies. Scanning Microscopy 1996, 10, 653.
(17) Davenas, J.; Thevenard, P.; Boiteux, G.; Fallavier, M.; Lu, X. L. Hydrogenated Carbon Layers Produced by Ion-Beam Irradiation of Pmma and Polystyrene Films. Nuclear Instruments & Methods in Physics Research Section B-Beam Interactions with Materials and Atoms 1990, 46, 317.
(18) Niyogi, S.; Hamon, M. A.; Perea, D. E.; Kang, C. B.; Zhao, B.; Pal, S. K.; Wyant, A. E.; Itkis, M. E.; Haddon, R. C. Ultrasonic dispersions of single-walled carbon nanotubes. Journal of Physical Chemistry B 2003, 107, 8799.

We claim:
1. A method comprising:
    (a) forming a polymer layer on a substrate, the polymer layer being a resist composition;
    (b) exposing a portion of the polymer layer to incident radiation to chemically alter the portion of the polymer layer;
    (c) forming a suspension of nanostructures in a solvent, the solvent suspending a plurality of nanostructures and forming a polymer coating on each of the plurality of nanostructures;
    (d) flowing the suspension of nanostructures in a specified direction across the polymer layer; and
    (e) adhering a polymer coated portion of each of the plurality of the nanostructures to the chemically altered portion of the polymer layer, each of the plurality of nanostructures being oriented in the flow direction.
2. The method of claim 1, further comprising:
    repeating operations (b), (c), (d), and (e), wherein each of the plurality of nanostructures in each repetition of operations (b), (c), (d), and (e) is positioned
    in one or more sets of locations and in one or more sets of orientation.
3. The method of claim 2, wherein each repetition of operations (b), (c), (d), and (e) is performed with a different type of nanostructures.
4. The method of claim 1, further comprising:
    etching a portion of the substrate adjacent to the a nanostructure of the plurality of nanostructures.
5. The method of claim 1, wherein the plurality of nanostructures comprise one or more of a group consisting of: a nanocrystal; a CdS or CdSe nanocrystal; a single walled nanotube; a multiwalled nanotube; a nanorod; a CdS or CdSe nanorod; a carbon nanorod; a nanowire; a carbon nanowire; a carbon nanosheet; a carbon nanobelt; a carbon nanotube bundle; a tin dioxide nanobelt; a boron-nitride nanotube; a silicon nanotube; a silicon nanobelt; a silicon nanowire; a compositionally modulated silicon nanowire; a noncrystalline nanostructure; and a silicon nanomembrane.
6. The method of claim 1, wherein each of the plurality of nanostructures has a dimension measurement of less than 200 nanometers.
7. The method of claim 1, wherein the solvent is selected from a group consisting of orthodichlorobenzene (ODCB), methoxybenzene, dimethylformamide, n-methyl pyrollidinone, n-methyl formamide, and paradichlorobenzene.
8. The method of claim 1, wherein the resist composition is selected from a group consisting of polymethyl methacrylate (PMMA), an acrylate-based resist, polybutene-1-sulphone (PBS), a copolymer of a-chloromethacrylate and a-methyl styrene, an epoxy copolymer of glycidyl methacrylate and ethyl acrylate (COP), and an acrylate olefin copolymer.

9. The method of claim 1, wherein operation (d) is performed with a spin coating process.

10. A method comprising:
    (a) forming a layer of polymer on a substrate, the polymer being a resist composition;
    (b) lithographically patterning the layer of polymer;
    (c) exposing a portion of the layer of polymer to incident radiation to chemically alter the portion of the polymer;
    (d) forming a suspension of nanostructures in a solvent, the solvent suspending a plurality of nanostructures and forming a polymer coating on each of the plurality of nanostructures;
    (e) flowing the suspension of nanostructures in a specified direction across the polymer layer; and
    (f) adhering a polymer coated portion of each of the plurality of the nanostructures to the chemically altered portion of the polymer layer, each of the plurality of nanostructures being oriented in the flow direction.

11. The method of claim 10, further comprising: repeating operations (b) through (f).

12. The method of claim 10, wherein the solvent is selected from a group consisting of orthodichlorobenzene (ODCB), methoxybenzene, dimethylformamide, n-methyl pyrollidinone, n-methyl formamide, and paradichlorobenzene.

13. The method of claim 10, wherein the resist composition is selected from a group consisting of polymethyl methacrylate (PMMA), an acrylate-based resist, polybutene-1-sulphone (PBS), a copolymer of a-chloromethacrylate and a-methyl styrene, an epoxy copolymer of glycidyl methacrylate and ethyl acrylate (COP), and an acrylate olefin copolymer.

14. The method of claim 10, wherein operation (e) is performed with a spin coating process.

* * * * *